United States Patent
Carapelli

(10) Patent No.: US 8,534,579 B2
(45) Date of Patent: Sep. 17, 2013

(54) GRINDING DEVICE FOR PRODUCTS THAT CAN BE GROUND

(75) Inventor: Giacinto Carapelli, Vaglia (IT)

(73) Assignee: Drogheria E Alimentari S.p.A., San Piero a Sieve, Florence (IT)

(*) Notice: Subject to any disclaimer, the term of this patent is extended or adjusted under 35 U.S.C. 154(b) by 101 days.

(21) Appl. No.: 13/280,538

(22) Filed: Oct. 25, 2011

(65) Prior Publication Data

US 2012/0273600 A1    Nov. 1, 2012

(30) Foreign Application Priority Data

Apr. 11, 2011  (EP) .................................. 11425099

(51) Int. Cl.
*A47J 17/00*  (2006.01)
*A47J 42/00*  (2006.01)

(52) U.S. Cl.
USPC ........................................ 241/169.1; 241/168

(58) Field of Classification Search
USPC .............................................. 241/168, 169.1
See application file for complete search history.

(56) References Cited

U.S. PATENT DOCUMENTS

| | | | | |
|---|---|---|---|---|
| 3,371,874 A * | 3/1968 | Reeves et al. | | 241/169.1 |
| 6,196,481 B1 * | 3/2001 | Barbagli | | 241/30 |
| 6,655,616 B1 * | 12/2003 | Wagner | | 241/169.1 |
| 7,207,511 B2 * | 4/2007 | Ng | | 241/101.3 |
| 7,604,191 B2 * | 10/2009 | Pai | | 241/169.1 |
| 2004/0124294 A1 * | 7/2004 | Ng | | 241/169.1 |
| 2004/0182958 A1 * | 9/2004 | Herren | | 241/169.1 |
| 2005/0211806 A1 * | 9/2005 | Ng | | 241/169.1 |
| 2008/0315022 A1 * | 12/2008 | Wilson et al. | | 241/169.1 |
| 2009/0134256 A1 * | 5/2009 | Rice | | 241/169.1 |
| 2012/0286081 A1 * | 11/2012 | Delbridge et al. | | 241/169.1 |
| 2013/0026269 A1 * | 1/2013 | Pai | | 241/169.1 |

FOREIGN PATENT DOCUMENTS

EP    1696775    9/2006

* cited by examiner

*Primary Examiner* — Faye Francis
(74) *Attorney, Agent, or Firm* — Shoemaker and Mattare

(57) ABSTRACT

A grinding device includes a mobile grinder group having openings for dispensing a ground product and a fixed counter-grinder having a central hole the surface of which comprises a grinding surface. The grinder group has a casing and a grinder which can be fixedly coupled, the grinder having a grinding surface that is inserted inside the central hole of the counter-grinder and that cooperates with the opposing grinding surface of the counter-grinder when grinding a product. The grinder group is arranged straddling the counter-grinder with the casing being arranged outside the counter-grinder. The casing can rotate with respect to the counter-grinder and is axially mobile with respect to the counter-grinder between two or more reciprocal adjustment positions. The grinder and the counter-grinder are made in a substantially rigid material and the casing is made from a substantially flexible material.

14 Claims, 3 Drawing Sheets

GRINDING DEVICE FOR PRODUCTS THAT CAN BE GROUND

FIELD OF THE INVENTION

The present invention concerns a grinding device for products that can be ground, such as spices and dry flavourings, dried mushrooms, chocolate, coffee and the like.

BACKGROUND ART

Various types of grinders for pepper and other spices are known. In these devices, the grinding occurs through friction between a fixed part and a mobile part. The two parts have, on the respective contact surfaces, a toothing or corrugations with a sharp edge that are intended to grind a product through friction (for example, pepper corns). In reality said surfaces are not in contact, but are spaced so as to create a gap between them defining the end grain-size of the ground product. The grinding occurs by making the mobile part rotate with respect to the fixed part, so that the pieces of the product are "held" between the teeth of the grinder and are minutely chopped by them up to the desired size.

The need of grinding different types of products (such as various spices, dried mushrooms, chocolate, coffee, etc.), often having irregular sizes, has led to the need of optimising the profile of the grinder and counter-grinder toothings, so as to prevent the smaller or bigger pieces of product from becoming stuck in between the teeth. However, this type of grinder, on the market for several years, does not allow the grinding grain-size to be adjusted, as on the other hand may be desirable in some culinary applications.

European patent EP 1 696 775 B1 solves this problem by providing a grinder in which the distance between the grinding surfaces can be adjusted by making the grinder slide in an axial direction with respect to the counter-grinder.

However, such a solution, in use, was found to have some drawbacks. Indeed, especially after use over quite a long time, the snap sliding of the grinder with respect to the counter-grinder tends to stiffen until it locks into one of the adjustment positions.

SUMMARY OF THE INVENTION

The present invention avoids the problems of the prior art by providing a universal grinding device, suitable for grinding all products that can be ground, and equipped with an adjustment of the grain-size of the ground product that is particularly efficient.

Such a result has been reached with a grinding device as outlined in the attached claims, the definitions of which form an integrating part of the present description.

The characteristics and the advantages of the grinding device object of the present invention shall become clearer from the description of some preferred embodiments, given here in the rest of the description as an example and not for limiting purposes.

DETAILED DESCRIPTION OF THE INVENTION

Figure 1:
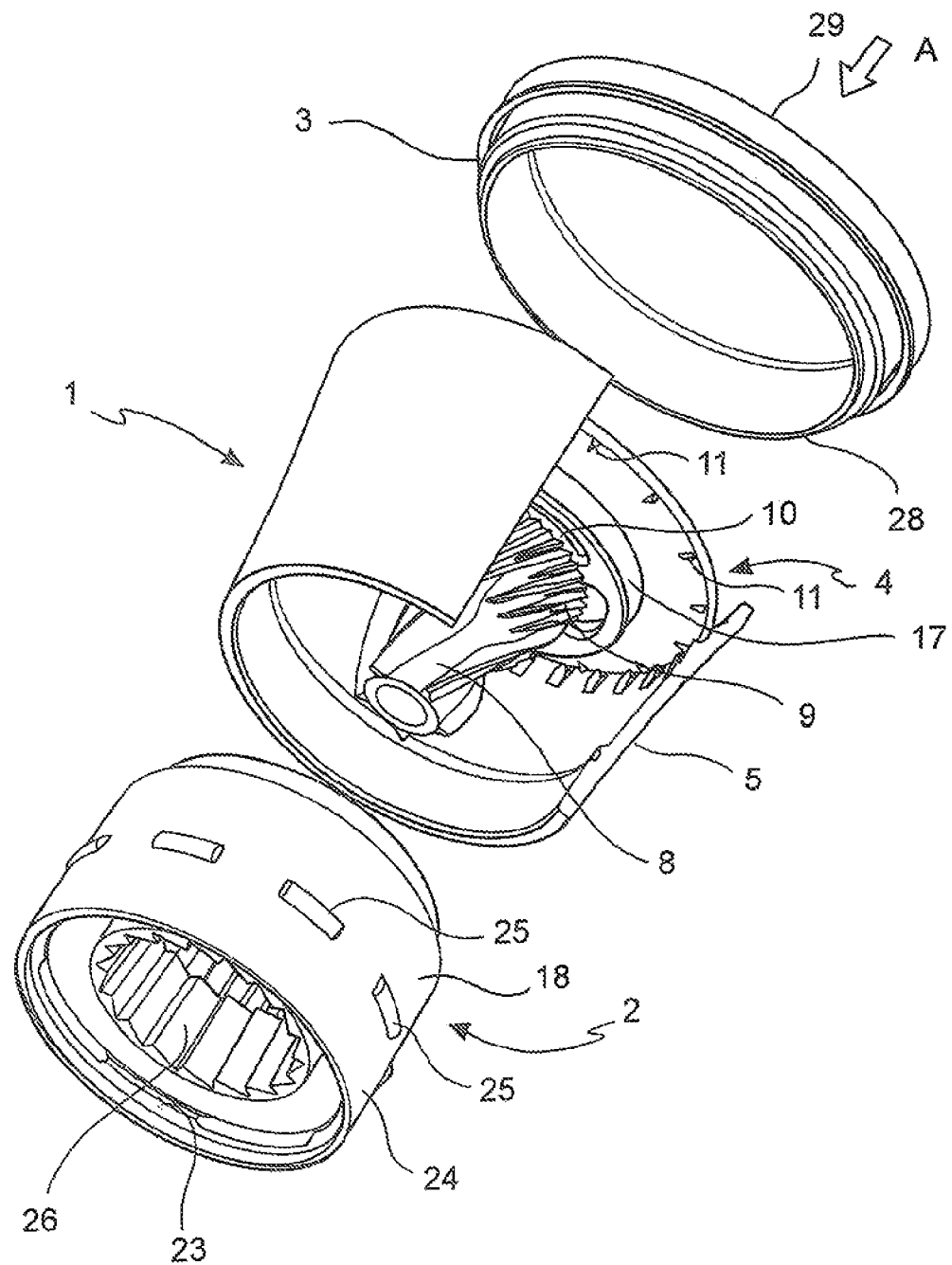
FIG. 1 represents an exploded and partially sectioned perspective view of the grinding device object of the present invention.
Figure 2:
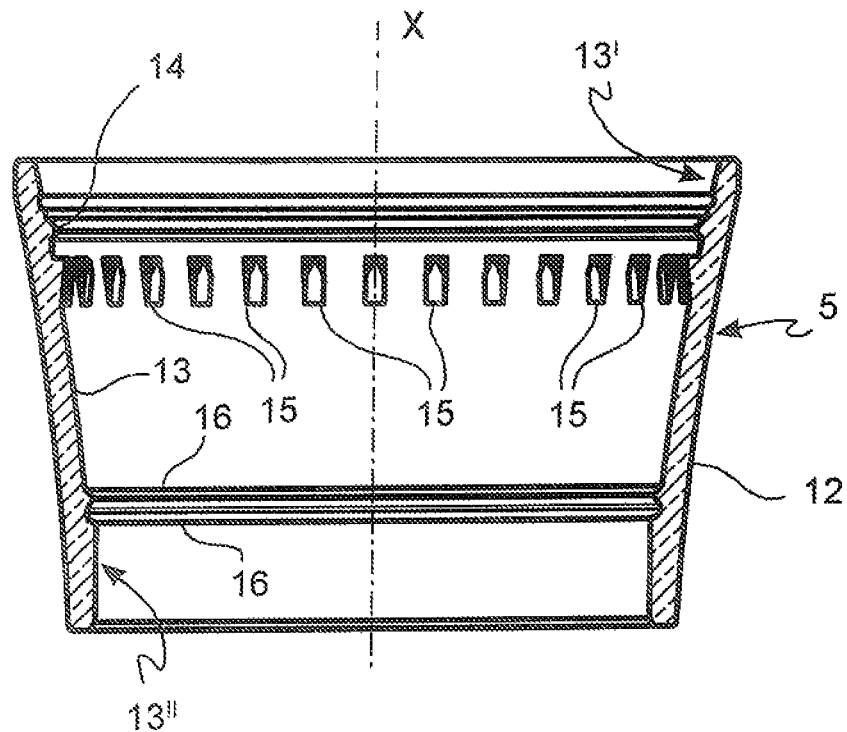
FIG. 2 represents a sectioned side view of a detail of the device of FIG. 1.
Figure 3:
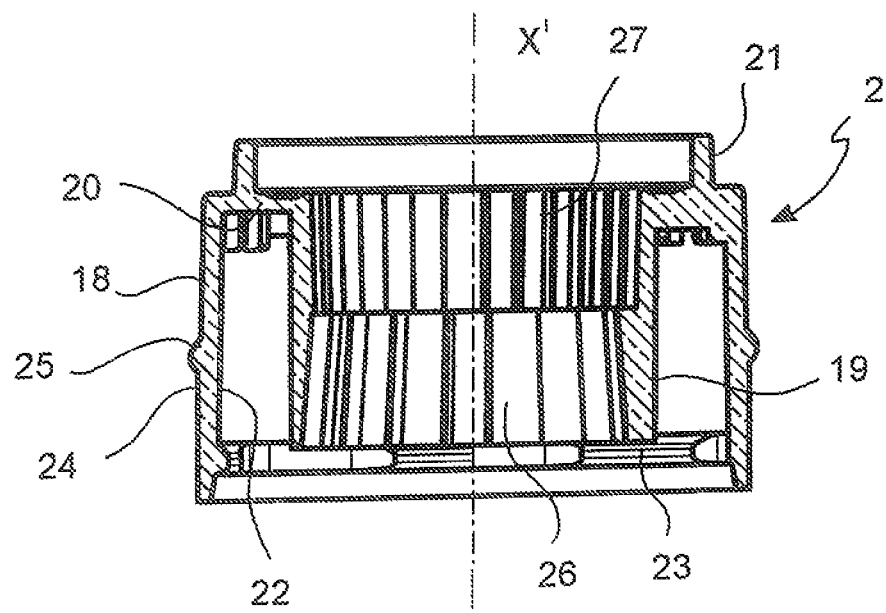
FIG. 3 represents a sectioned side view of the counter-grinder of the grinding device of FIG. 1.
Figure 4:
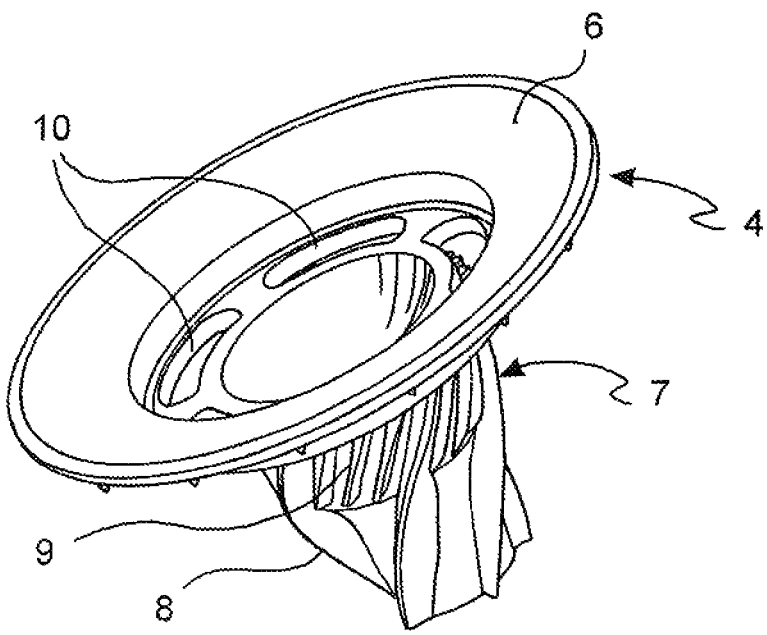
FIG. 4 represents a perspective view of the grinder of the grinding device of FIG. 1.

With reference to the figures, the grinding device object of the present invention comprises a mobile grinder group 1, a fixed counter-grinder 2, intended to engage with the neck of a spice container (not shown), and a cover 3.

The grinder group 1 comprises a grinder 4 and a casing 5.

The grinder 4 comprises a base disc 6 from which a grinding cone 7, equipped with a grinding surface, projects perpendicularly.

The grinding surface comprises a first series 8 and a second series 9 of ribbings, in which the ribbings of said second series 9 have pitch and height that is smaller than the ribbings of said first series 8. Moreover, preferably, the ribbings of said second series 9 cover only the part of the grinding surface near to the disc 6.

In the preferred embodiment of the invention, at least one of such a series of ribbings has ribbings with a substantially helicoidal profile.

The base of the grinding cone 7 takes up the central portion of the disc 6. Around such a base of the grinding cone 7, the disc 6 has a plurality of openings 10. The openings 10 are arranged on a step portion 17 of the surface of the disc 6.

The openings 10 have a curved slit shape. Such a shape prevents the grains of product with a size that is greater than desired from coming out from the grinding device. The openings 10 thus act as openings for dispensing the ground product.

A plurality of small teeth 11 is arranged as a crown along the periphery of the disc 6, on the same face from which the grinding cone 7 protrudes.

The casing 5 comprises a countersunk cylindrically-shaped hollow body 12, open at the two ends, which projects around an axis X. The inner surface 13 of the hollow body 12 comprises a first end portion 13' and a second end portion 13". The first end portion 13'—corresponding, in the embodiment shown in the figures, to the portion with greater diameter—comprises an annular ridge 14, having a receiving surface facing outwards, and a plurality of teeth 15 arranged below the annular ridge 14 and having a substantially flat abutment surface facing towards it.

Between the teeth 15 and the annular ridge 14 there is thus an annular seat suitable for receiving and snap-locking the edge of the disc 6 of the grinder 4. In such a way, the casing 5 and the grinder 4 are fixedly attached. The small teeth 11 of the disc 6 can cooperate with the teeth 15 of the casing 5 so as to avoid the rotation around the axis X of one element with respect to the other.

Near to the second end portion 13" of the inner surface 13 of the casing 5, or in an intermediate position between the first and the second end portion 13', 13", there are in an axially spaced position two or more annular seats 16, which can be formed in the thickness of the cylindrical body 12 or be defined by raised walls.

Preferably, there shall be 2 or 3 annular seats 16.

The counter-grinder 2 comprises an outer body 18 and an inner body 19, both having a hollow cylindrical shape, concentric and connected at one end by a substantially flat joining surface 20. Between the outer body 18 and the inner body 19 a gap is thus formed that is closed at the joining surface 20 and that is open at the opposite end. It is also possible to enclose the two cylindrical bodies 18, 19 in a single body with greater thickness, which in any case will keep the joining surface 20 between the inner and outer surface. This solution is however less advantageous since it leads to a useless waste of material.

From the joining surface 20 an annular profile 21 coaxially projects outwards, said profile having a diameter that is intermediate with respect to the diameter of the outer body 18 and to that of the inner body 19 and an inner diameter that is greater than the diameter of the step portion 17 of the disc 6 of the grinder 4. Moreover, the height of the annular profile 21 substantially corresponds to the height of said step portion 17 of the grinder 4, so that, when the grinding device is assembled, the annular profile 21 can come into abutment with the disc 6 of the grinder 4 and the step portion 17 of the latter comes into abutment with the joining surface 20.

The outer body 18 has a length that is longer than the inner body 19 and has on its inner surface 22, at the portion projecting with respect to the inner body 19, means for fixing 23 to the neck of a container. In the embodiment of the figures, such fixing means are made up of a plurality of projections 23 arranged circumferentially. Such projections 23 make it possible to mount and snap-lock the counter-grinder 2 on the neck of a container for spices (not shown), which is typically made from glass and that has a corresponding seat for receiving said projections 23. It shall be possible however to foresee a fixing system with screws, by foreseeing a threaded portion of the inner surface 13 of the casing 5 and a corresponding threaded surface on the neck of the container. The first solution is however preferable, since it avoids unscrewing and therefore the involuntary removal of the grinding device from the container when rotating the grinder during use.

The outer surface 24 of the outer body 18 has a series of adjustment ridges 25 arranged in a circumferential configuration, in a position such as to be able to cooperate, when the grinding device is assembled, with the annular seats 16 arranged inside the casing 5, as described above.

The inner surface of the counter-grinder 2 defines a grinding surface on which there are a first series 26 and a second series 27 of ribbings, respectively arranged at said first series 8 and at second series 9 of ribbings on said grinding cone 7. The ribbings of said second series 27 have pitch and height that is smaller than the ribbings of said first series 26.

Preferably, the ribbings have a saw-tooth profile, or rather with one oblique side and one vertical side, which form a sharp edge at the apex.

In the preferred embodiment of the invention, the grinding surface of the counter-grinder 2 has two frustoconical-shaped sections, converging towards the centre so as to form a substantially hour glass-shaped surface, the first of said sections comprising said first series 26 of ribbings and the second of said sections comprising said second series 27 of ribbings.

In any case, the inner diameter of the counter-grinder 2 is always such as to form a gap between its grinding surface and the grinding surface of the grinder 4, so as to allow the particles of product to be ground to be held between the teeth and, once ground, to fall towards the openings 10. Moreover, thanks to the hour glass configuration of the grinding surface of the counter-grinder 2, the gap formed between the first series 8, 26 of grinder and counter-grinder ribbings has a funnel-shaped configuration, which makes it possible to convey the product to be ground towards the grinding area and move downwards through gravity, progressively as it is chopped into ever smaller grains.

Figure 5:
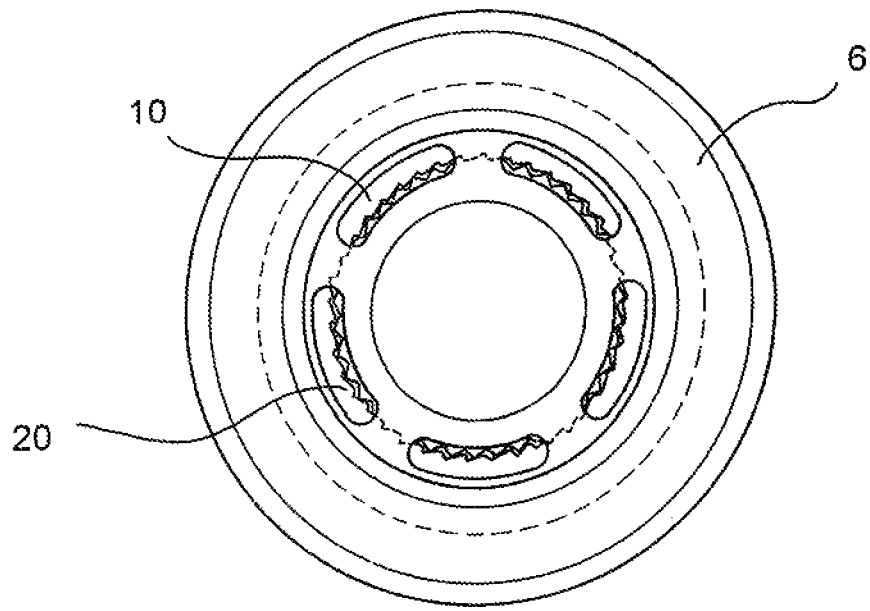
FIG. 5 shows a plan view according to the direction A of FIG. 1 of the assembly grinder/counter-grinder.

As can be seen in FIG. 5, the inner diameter of the inner body 19 of the counter-grinder 2 is smaller than the diameter of the circumference on which the outer sides of the openings 10 are arranged and is greater than the circumference on which the inner sides thereof are arranged. Moreover, the profile of the opening 10 is further defined by the ribbings projecting from the grinding surfaces both of the grinder 4 and of the counter-grinder 2, as clearly visible in FIG. 5. This causes the joining surface 20 of the counter-grinder 2 to partially obstruct the openings 10 for dispensing the ground product, preventing the grains with undesired size from coming out.

The cover 3 is disc-shaped and has a closing surface 29 and a shape-coupling profile 28 with a diameter that is smaller and is suitable for being inserted in the opening of the casing 5 at the first end portion 13' of the inner surface 13 and for engaging with it.

According to one particular aspect of the present invention, the grinder 4 and the counter-grinder 2 are made in a substantially rigid material, preferably a plastic material, whereas the casing 5 is made from a substantially flexible material, also in this case preferably a plastic material. Preferably, the rigid plastic is an acetalic resin (POM), whereas the flexible plastic is polypropylene (PP).

The grinding device object of the invention is assembled in the following manner.

The grinder 4 is inserted in the casing 5 through the opening at the first end portion 13', to its snap-engagement in the seat formed between the annular ridge 14 and the teeth 15. The counter-grinder is then inserted through the opposite opening, until the annular profile 21 abuts with the disc 6 of the grinder 4 and with snap-engagement of the ridges 25 with the annular seat 16 of the casing 5 closest to said first end portion 13'. The axis X' of the counter-grinder and the respective axis X of the grinder 4 thus coincide.

The cover 3 can thus be placed to close the grinding device.

When the grinding device is assembled, the grinder group 1 is positioned straddling the counter-grinder 2, with the casing 5 arranged outside and able to be grasped by the user and the grinding cone 7 of the grinder 4 inserted in the central cavity of the counter-grinder 2.

The grinder group 1, which as mentioned fixedly attaches the grinder 4 with the casing 5, can thus carry out two movements: (i) a rotary movement with respect to the counter-grinder, which constitutes the movement responsible for grinding; (ii) an axial movement along the axis X between various adjustment positions defined by the position and by the number of annular seats 16 present on the inner surface 13 of the casing 5. This last axial movement is discontinuous, since it involves the snap-engagement of the adjustment ridges 25 with an annular seat 16 or with the following seat.

There are typically 2 or 3 annular seats 16.

The operation of the grinding device object of the invention is as follows.

When the container is turned upside-down, the grains, for example of pepper, are conveyed in the space between the grinding surfaces of the grinder 4 and of the counter-grinder 2. In such an area a first rough grinding is carried out, which is obtained by making the grinder group 1 rotate around the longitudinal axis X. Indeed in such a way the grains are held between the ribbings 8, 9 of the grinder 4 and the ribbings 26, 27 of the counter-grinder 2 and are then chopped through friction. The grain-size of the ground product is a function of the width of the gap between the two grinding surfaces, through which the grains, partially ground, move along through gravity in the direction of the dispensing openings 10, obtaining an increasingly finer grinding.

Indeed, the distance between the grinding surfaces is smaller at the second ribbings 9, 27 and the number of ribbings is greater. All of this contributes to the fine grinding of the product.

The rotation movement of the grinder group 1 around the axis X is typically an alternate movement in the clockwise-anti-clockwise direction. Whereas the movement in one direction leads to the grinding of the grains, the movement in the other direction frees them from the hold between the ribbings, allowing them to fall in the following area or towards the outside through gravity.

As mentioned above, the distance between the grinding surfaces defines the grain-size of the ground product. For such a reason, the grinding device of the invention has various adjustment possibilities, which are obtained by moving the grinder group 1 in an axial direction with respect to the fixed counter-grinder 2, so that the adjustment ridges 25 come to occupy a first, a second or, if necessary, a further annular seat 16. In such a manner, on one hand the distance between the grinding surfaces is modified, and on the other hand the joining surface 20 is moved away from or is moved closer to the openings 10, thus modifying the dispensing opening.

The grinding device according to the invention has many advantages.

The adjustment of the grinder group 1 with respect to the counter-grinder 2 makes it possible to obtain different levels of grinding of a same product or to use the same grinder for different types of products, such as dried fruit or dried mushrooms, which require a different grinding grain-size.

The fact of having made the grinder 4 and the counter-grinder 2 from rigid plastic—therefore suitable for grinding—and the casing 5 made from flexible plastic, although increasing the complexity of the device, has the surprising advantage of making the axial sliding of the grinder group 1 extremely soft and easy to adjust. Vice versa, if the casing 5 was also made from a substantially rigid material—as it would be if the casing 5 and the grinder 4 were formed in a single piece, since the grinding surface must necessarily be rigid—the axial adjustment of the grinder group 1 would be a lot more inconvenient, often leading to the seizing of the device.

Another characteristic which has been found to be extremely advantageous is the fact of having a series of adjustment ridges 25 instead of a continuous annular ridge. It has indeed been noted that the fine dust of the ground product can partially pass in the gap between the casing 5 and the outer surface 24 of the counter-grinder 2, which over time leads to a partial obstruction of the annular seats 16 and/or the seizing of the grinder group 1, with respect both to the axial adjustment and with respect to the rotation grinding movement, due to the increased friction between the fixed and mobile members. Vice versa, the discontinuous adjustment ridges 25 create openings for discharging the ground product and therefore keep the gap between casing 5 and counter-grinder 2 free.

It should be clear that what has been described is only one embodiment of the grinding device object of the present invention, to which a man skilled in the art is capable of carrying out all the modifications necessary for its adaptation to particular applications, without moreover, departing from the scope of protection of the present finding.

What I claim is:

1. A grinding device comprising a mobile grinder group having openings for dispensing a ground product and a fixed counter-grinder having a central hole the surface of which comprises a grinding surface, wherein the grinder group comprises a casing and a grinder which can be fixedly coupled, said grinder having a grinding surface inserted inside the central hole of the counter-grinder and that cooperates with the opposing grinding surface of the counter-grinder when grinding a product, said grinder group being arranged straddling said counter-grinder with the casing being arranged outside the counter-grinder, wherein the casing can rotate with respect to the counter-grinder and is axially mobile with respect to the counter-grinder between two or more reciprocal adjustment positions, said grinder comprises a base disc from which a grinding cone, on which said grinding surface is arranged, projects perpendicularly, the grinding surface comprising a first series and a second series of ribbings, wherein the ribbings of said second series have pitch and height that are smaller than the ribbings of said first series, the base of the grinding cone takes up the central portion of the disc, wherein the surface of the disc forms, around such a base of the grinding cone, a step portion on which a plurality of openings for dispensing the ground product is arranged, and the grinder and the counter-grinder are made from a substantially rigid material and the casing is made from a substantially flexible material.

2. A grinding device according to claim 1, wherein said substantially rigid material is a plastic material and said substantially flexible material is a plastic material.

3. A grinding device according to claim 1, wherein said substantially rigid material is acetalic resin.

4. A grinding device according to claim 1, wherein said flexible material is polypropylene.

5. A grinding device according to claim 1, wherein said casing comprises an inner surface having a first end portion and a second end portion, the first end portion comprising an annular ridge having a receiving surface facing outward and a plurality of teeth spaced by the annular ridge and having a substantially flat abutment surface facing towards it, between the teeth and the annular ridge being there an annular seat suitable for receiving and snap-locking the edge of the disc of the grinder.

6. A grinding device according to claim 1, wherein said inner surface of the casing comprises, in an axially spaced position, two or more annular seats.

7. A grinding device according to claim 1, wherein said counter-grinder comprises an outer body and an inner body, connected at one end by a substantially flat joining surface, wherein an annular profile coaxially projects outwards from said joining surface, said profile having a diameter that is intermediate with respect to the diameter of the outer body and to that of the inner body and having an inner diameter that is greater than the diameter of the step portion of the disc of the grinder, and wherein the height of the annular profile substantially corresponds to the height of said step portion, so that the annular profile can come into abutment with the disc and the step portion can come into abutment with the joining surface.

8. A grinding device according to claim 7, wherein the inner diameter of the inner body of the counter-grinder is smaller than the diameter of the circumference on which the outer sides of the openings are arranged and is greater than the circumference on which their inner sides are arranged.

9. A grinding device according to claim 1, wherein said counter-grinder comprises means for fixing to the neck of a container.

10. A grinding device according to claim 9, wherein the outer body of the counter-grinder has a length that is greater than that of the inner body and has on its inner surface, at the portion that projects with respect to the inner body, a plurality of projections arranged circumferentially, for mounting and snap-locking the counter-grinder onto the neck of said container.

11. A grinding device according to claim 1, wherein the outer surface of the counter-grinder has a series of adjustment ridges arranged in a circumferential configuration, which cooperate with the annular seats arranged inside the casing for the axial adjustment of the grinder group with respect to the counter-grinder.

12. A grinding device according to claim 1, wherein said ribbings have a saw-tooth profile.

13. A grinding device according to claim 1, wherein the grinding surface of the counter-grinder has two frustoconical-shaped sections, converging towards the center so as to form a surface with a substantially hour glass-shaped surface, the first of said sections comprising said first series of ribbings and the second of said sections comprising said second series of ribbings.

14. A grinding device according to claim 1, said device further comprising a cover.

\* \* \* \* \*